(12) United States Patent  (10) Patent No.: US 8,127,655 B1
Kay  (45) Date of Patent: Mar. 6, 2012

(54) LOW FORCE BOMB RACK RELEASE MECHANISM

(75) Inventor: Steven D. Kay, Greenlawn, NY (US)

(73) Assignee: Exelis, Inc., McLean, VA (US)

( * ) Notice: Subject to any disclaimer, the term of this patent is extended or adjusted under 35 U.S.C. 154(b) by 358 days.

(21) Appl. No.: 12/401,869

(22) Filed: Mar. 11, 2009

(51) Int. Cl.
*B64D 1/00* (2006.01)

(52) U.S. Cl. ........................................................ 89/1.54

(58) Field of Classification Search .................... 89/1.51, 89/1.54, 1.53, 1.58; 244/137.4
See application file for complete search history.

(56) References Cited

U.S. PATENT DOCUMENTS

| | | | | |
|---|---|---|---|---|
| 2,869,426 A * | 1/1959 | Wilkie | ............. | 89/1.57 |
| 3,037,805 A * | 6/1962 | Geffner et al. | ............. | 294/82.26 |
| 3,056,623 A * | 10/1962 | Herbert | ............. | 294/82.26 |
| 3,273,459 A * | 9/1966 | Lardin | ............. | 89/1.54 |
| 3,722,944 A * | 3/1973 | Dand | ............. | 294/82.26 |
| 3,752,034 A * | 8/1973 | Waters | ............. | 89/1.58 |
| 3,954,233 A * | 5/1976 | Hasquenoph et al. | ..... | 244/137.4 |
| 3,982,466 A * | 9/1976 | Baker | ............. | 89/1.58 |
| 4,043,525 A * | 8/1977 | Jakubowski, Jr. | .......... | 244/137.4 |
| 4,049,222 A * | 9/1977 | Peterson | ............. | 244/137.4 |
| 4,050,656 A * | 9/1977 | Peterson | ............. | 244/137.4 |
| 4,183,480 A * | 1/1980 | Jakubowski, Jr. | .......... | 244/137.4 |
| 4,202,576 A * | 5/1980 | Hasquenoph et al. | ..... | 294/82.26 |
| 4,313,582 A * | 2/1982 | Hasquenoph et al. | ..... | 244/137.4 |
| 4,318,561 A * | 3/1982 | Hasquenoph et al. | ..... | 294/82.26 |
| 4,347,777 A * | 9/1982 | Jakubowski et al. | .......... | 89/1.58 |
| 4,632,338 A * | 12/1986 | Hasquenoph et al. | ..... | 244/137.4 |
| 4,829,878 A * | 5/1989 | Thompson | ............. | 89/1.54 |
| 4,922,799 A * | 5/1990 | Bartl et al. | ............. | 89/1.819 |
| 5,583,312 A | 12/1996 | Jakubowski, Jr. | | |
| 5,932,829 A | 8/1999 | Jakubowski, Jr. | | |
| 6,009,788 A | 1/2000 | Jakubowski, Jr. et al. | | |
| 6,035,759 A | 3/2000 | Jakubowski, Jr. et al. | | |
| 6,347,768 B1 | 2/2002 | Jakubowski, Jr. et al. | | |
| 6,481,669 B1 * | 11/2002 | Griffin | ............. | 244/137.4 |
| 7,083,148 B2 * | 8/2006 | Bajuyo et al. | ............. | 244/137.4 |
| 7,147,188 B2 * | 12/2006 | Jakubowski et al. | ...... | 244/137.4 |
| 2006/0060714 A1 | 3/2006 | Jakubowski, Jr. et al. | | |
| 2006/0108478 A1 * | 5/2006 | Bajuyo et al. | ............. | 244/137.4 |
| 2010/0024632 A1 * | 2/2010 | Jakubowski et al. | .......... | 89/1.53 |

* cited by examiner

*Primary Examiner* — Michael Carone
*Assistant Examiner* — Jonathan C Weber
(74) *Attorney, Agent, or Firm* — RatnerPresia (57) ABSTRACT

A low force weapon ejection system includes a hook for engaging a store, a primary sear for applying a primary pressure against the hook, and a secondary sear for applying a secondary pressure against the primary sear. When the primary and secondary pressures are applied, respectively, against the hook and the primary sear, the hook is prevented from releasing the store. When the primary and secondary pressures are reduced, the hook is enabled to release the store. The low force weapon ejection system reduces the size and weight of various elements in a conventional ejection system that requires greater forces for actuating, releasing and ejecting a store.

10 Claims, 7 Drawing Sheets

LOW FORCE BOMB RACK RELEASE MECHANISM

FIELD OF THE INVENTION

The present invention relates, in general, to aircraft weapon ejection systems. More particularly, the present invention relates to a low force release linkage mechanism for ejection bomb racks mounted on an aircraft.

BACKGROUND OF THE INVENTION

Military aircraft utilize racks located beneath the wings and fuselage to carry and dispense stores upon command. Stores may be used to contain munitions, i.e. bombs, or to contain other material to be dropped from the aircraft, i.e. rockets or missiles, upon command from the cockpit, for example.

Conventionally, an ejector rack includes a release mechanism which is activated to mechanically release and, subsequently, forcibly eject the stores from the aircraft. Most ejector racks, at one time, utilized pyrotechnic (explosive) cartridges which, upon ignition, generate high pressure gas for actuating the mechanical release mechanism, as well as providing high pressure gas to forcibly eject the stores from the racks mounted on the aircraft.

A characteristic of an ejector rack powered by a pyrotechnic (explosive) cartridge is a short, very high pressure pulse. This high pressure pulse allowed for a reliable removal of the sear from the retaining hook and release of the weapon. The cartridges were somewhat unreliable, however, and their handling, maintenance, and costs were significant.

In order to avoid the problems associated with the pyrotechnic cartridges, the ejector racks migrated to cold gas (pneumatic) systems. As such, an ejection system includes an on-board source of pressurized gas, a release mechanism for mounting the store on the aircraft, and an actuation system for driving the release mechanism between closed and open positions.

The actuation system includes an accumulator for receiving and storing pressurized gas from a source, which may or may not be located on board the aircraft. Actuation of a control valve causes a primary valve to move from a closed position to an open position. This movement allows pressurized gas to flow from the accumulator into the actuation chamber, forcing a separate, hook release piston to move in a linear direction. As a result, the pressurized gas forces a ram attached to the hook release piston to engage and unlock the hooks holding the stores to the rack. Pressurized gas entering the actuator chamber is further capable of exiting from an opposite end of the actuator chamber and flow into one or more feed tubes that deliver the pressurized gas into engagement with thrust pistons. The pressurized gas causes the thrust pistons to forcibly eject the newly unlocked stores from the rack.

While the pneumatic ejection system provides an improvement over earlier pyrotechnic ejection systems, it has been discovered that there was a need to increase the size of the pneumatic ejection system in order to increase the force of the system. In order for the accumulator to accommodate enough pressurized gas to provide sufficient force to unlock the hooks and forcibly eject the stores, the volume of the accumulator needed to be increased. This was achieved by increasing the outer surface area of the accumulator.

Thus, while the pneumatic injection system is able to reduce the overall maintenance costs of the pyrotechnic ejection system, it unsatisfactorily increases the size of the pneumatic ejection system. As a result, the pneumatic ejection system may not fit in a rack that was previously designed to employ a pyrotechnic cartridge, without significant redesign of the rack.

In general, the pneumatic ejection system has a lower peak pressure than the pyrotechnic ejection system. The lower peak pressure of the pneumatic ejection system requires a larger piston area (force=area×pressure) in order to generate the same force, and reliably remove the sear. This is especially more complicated in light of the higher performance of modern aircraft. Packaging of a larger valve hardware, along with its greater weight, is a technical challenge of the pneumatic ejection system.

The heart of the pneumatic ejection system is the accumulator, or the pneumatic power module (PPM). The PPM represents the largest and highest cost component in an ejector rack assembly. The PPM is a combination pressure storage reservoir and two stage valve assembly. The first stage removes the sear from the hook, thereby allowing release of the weapon. The second stage opens the path for the pressurized gas to the ejector pistons, thereby pushing the weapon away. The complication and, therefore cost, is in packaging all the porting required around the large area, and the stroke piston required to reliably remove the sear from the hook under high g-force loads generated by modern fighter aircraft.

Another complication is the sear, which is used to actuate a release of the ejection system. The sear includes a release linkage, which is actuated upon a weapon release command from the cockpit of the aircraft (for example). The sear release linkage needs to be robust (heavy) in order to operate reliably under heavy store loads and high aircraft g-forces.

Another challenge is the requirement for a reversible in-flight lock, or RIFL, as it is commonly known. The RIFL is a safety system that mechanically and electrically "safes" the bomb rack, preventing accidental release, during flight and during ground maintenance operations. The hardware and structural integrity of the RIFL, which is necessary to "block" an accidental firing, is very robust (heavy). This is true even when fabricated from the best (expensive) materials, because of the large forces that must be resisted.

As will be explained, the present invention provides a low force release mechanism for a pneumatic ejection system. The present invention mitigates the complications and drawbacks of conventional pneumatic ejection systems. It also frees up packaging space, thereby allowing easier placement of additional bomb rack sub-systems into the rack.

SUMMARY OF THE INVENTION

To meet this and other needs, and in view of its purposes, the present invention provides a low force weapon ejection system including a hook for engaging a store; a primary sear configured to apply a primary pressure against the hook; and a secondary sear configured to apply a secondary pressure against the primary sear. When the primary and secondary pressures are applied, respectively, against the hook and the primary sear, the hook is prevented from releasing the store. When the primary and secondary pressures are reduced, the hook is enabled to release the store.

The primary sear includes first and second primary ends. The first primary end is hinged for pivoting. The second primary end is configured to apply pressure against the hook. When the second primary end is pivoted transversely against the hook, the applied pressure prevents the hook from releasing the store.

The primary sear includes first and second primary ends forming a longitudinal primary line therebetween. The secondary sear includes first and second secondary ends forming a longitudinal secondary line therebetween. The primary line is oriented to move transversely to the secondary line. When the second secondary end is disposed adjacent to the second primary end, the hook is prevented from releasing the store.

The second primary end is configured to apply pressure against the hook. The first secondary end is coupled to an actuator. When the actuator is set to actuate a release of the store, the second secondary end is pivoted away from the second primary end for reducing pressure against the primary sear.

The ejection system includes a hook-link coupled to the hook for pivoting the hook to release the store. When the hook is enabled to release the store, the hook-link is configured to pivot the hook and release the store. The hook-link is coupled to a valve controlled by an accumulator. The accumulator provides pneumatic air to the valve to pivot the hook and release the store. This hook is a large hook for engaging a lug of a heavy store. The system further includes a small hook for engaging a lug of a small store. The hook-link is connected between the large hook and small hook. When the hook-link is enabled to release the store, the hook-link is configured to pivot the large and small hooks and release either the heavy store or the small store.

Another embodiment of the present invention includes a low force weapon ejection system having a hook for engaging a store; a primary sear having first and second primary ends, where the first primary end is hinged for pivoting and the second primary end is configured to actuate release of the store; and a secondary sear having first and second secondary ends, where the first secondary end is coupled to an actuator, and the second secondary end is configured to control pressure against the primary sear. When the actuator is set to prevent the release, the second secondary end is configured to apply pressure against the primary sear and, in turn, the second primary end is configured to apply pressure against the hook and prevent release of the store. When the actuator is set to enable the release, the second secondary end is configured to reduce pressure against the primary sear and, in turn, the second primary end is configured to reduce pressure against the hook and enable the release of the store.

The first and second primary ends form a longitudinal primary line therebetween. The first and second secondary ends form a longitudinal secondary line therebetween. The primary line is oriented to move transversely to the secondary line.

An actuator is configured to pivot the secondary sear, upon an actuation command. The primary line moves transversely to the secondary line, upon the actuation command.

A hook-link is coupled to the hook for pivoting the hook to release the store. When the hook is enabled to release the store, the hook-link is configured to pivot the hook and release the store. This hook is a large hook for engaging a lug of a heavy store. The system further includes a small hook for engaging a lug of a small store. The hook-link is connected between the large and small hooks. When the hook-link is enabled to release the store, the hook-link is configured to pivot the large and small hooks and release either the heavy store or the small store.

Yet another embodiment of the present invention includes an ejector rack assembly having an actuator for actuating a pivot-link to move in a linear direction; a secondary sear coupled to the pivot-link, where the secondary sear is pivoted by the linear movement of the pivot-link; a primary sear coupled to the secondary sear, where the primary sear is pivoted by the pivoting of the secondary sear; and a hook for engaging a lug of a store in an aircraft, where the hook is pressed by the primary sear to prevent pivoting of the hook. When the actuator actuates the pivot-link, the primary sear is configured to reduce pressure against the hook and the hook is enabled to release the store. A hook-link is coupled to the hook for pivoting the hook. When the primary sear reduces the pressure against the hook, the hook-link is configured to pivot the hook and release the store. The secondary sear includes a sliding pin engaged in a slit. When the sliding pin moves from one end of the slit to another end of the slit, the primary sear is effective in reducing the pressure against the hook.

It is understood that the foregoing general description and the following detailed description are exemplary, but are not restrictive, of the invention.

BRIEF DESCRIPTION OF THE FIGURES

The invention may be understood from the following detailed description, when read in connection with the accompanying figures.

DETAILED DESCRIPTION OF THE INVENTION

The present invention provides a low force release mechanism for a pneumatic ejection system. With low force release arrangements incorporated into an ejector rack assembly, the force required by the present invention to release and eject a store is significantly reduced over the conventional rack assemblies. The ejector rack assembly of the present invention becomes smaller and lighter than the conventional rack assemblies.

As will be described, the present invention includes links for transferring load from one store hook to another store hook that may be sized smaller, thereby saving weight and space. In addition, the sear may be applied directly to the larger hook (which carries a heavy store), instead of the smaller hook (which carries a lighter store). In this manner, the links need only to retain the load from the larger hook to the smaller hook and may be sized for the smaller hook, again saving weight and space.

As will also be described, the accumulator, or PPM may be made smaller, because of the low force release mechanism of the present invention. The sweep area of the piston may be reduced, thereby simplifying the valve body of the PPM. The low force release mechanism of the present invention also potentially permits isolating the release and ejection functions of the pneumatic ejection system.

The release function of the present invention may be accomplished by an electric solenoid and the ejection function of the present invention may be accomplished by a mechanical linkage. This may eliminate the PPM entirely, basically redefining current pneumatic bomb rack design. The RIFL, which is part of the PPM and includes an electric solenoid acting as a pilot valve for the RIFL actuator, may now include only the electric solenoid, further simplifying and reducing PPM costs.

Figure 1:
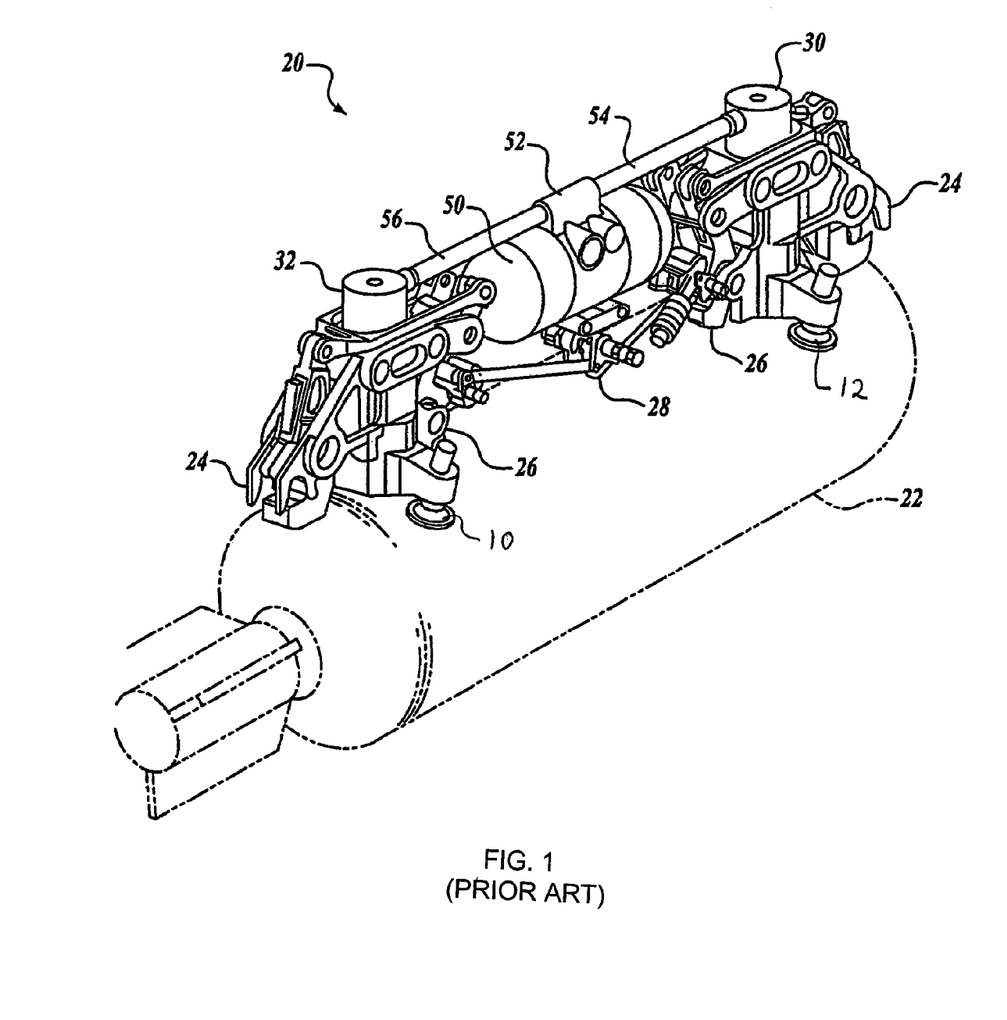
FIG. 1 is a conventional pneumatic ejection system including an accumulator and two thrusters.

In order to appreciate the differences between the present invention and a conventional pneumatic ejection system, reference is now made to FIG. 1, which is also disclosed by Jakubowski, Jr. in U.S. application Ser. No. 10/926,630 (Publication No. 2006/0060714), filed on Aug. 26, 2004. Referring to FIG. 1, pneumatic ejection system 20 is configured to eject store 22 from an aircraft (not shown). Store 22 is suspended from the ejection system by carrier 24 which includes hooks 26 and hook actuating mechanism 28. The ejection system also includes pneumatically actuated thrusters 30 and 32 which include rams (not shown), each of which is disposed for reciprocating motion within its respective thruster. The purpose of the thruster is to forcibly eject store 22 downwardly and away from the aircraft, after release of the store by carrier 24, to minimize the possibility of the store striking the aircraft after release. FIG. 1 shows the rams in their fully retracted position and with hooks 26 in engagement with carrier 24.

Both the thrusters and the release mechanism are actuated by compressed air from a remotely located on board pressurization unit (not shown) which supplies pressurized air to accumulator 50. The accumulator 50 is in fluid communication with thrusters 30 and 32 by means of manifold 52 and feed conduits 54 and 56, respectively. Upon command, high pressure air is provided to accumulator 50 by means of a fluid actuator located within the accumulator. The fluid actuator activates hook release mechanism 28 and opens hooks 26, thereby releasing store 22. High pressure air is also directed by the fluid actuator to thrusters 30 and 32 driving the rams downwardly and forcibly ejecting store 22 away from the aircraft.

In order to maintain the weapon in its proper position suspended beneath ejection system 20, each thruster 30, 32 has a pair of outwardly extending sway braces 10 and 12. Conventional adjustable set screws each extend through threaded openings in the sway braces. Each of the set screws may be advanced into contract with the weapon to prevent the weapon from swaying.

Figure 2:
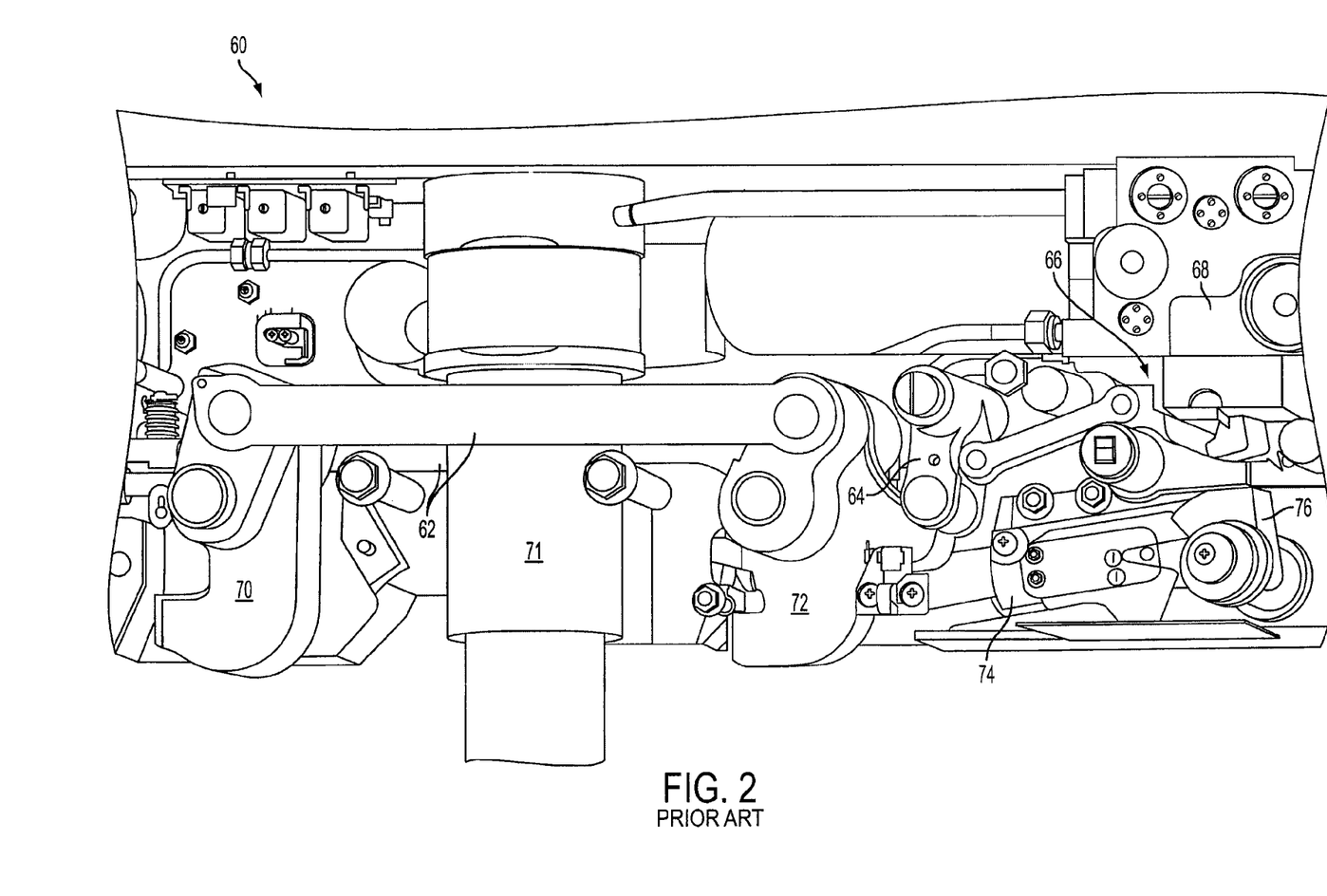
FIG. 2 is an isometric view of another conventional pneumatic ejection system, showing details of elements surrounding one thruster, including a safety feature and a sear.

FIG. 2 is a detailed view of a section of a conventional pneumatic ejection rack assembly, generally designated as 60. The ejection rack assembly 60 includes PPM 68 coupled to two thrusters 71 (only one is shown). Also shown are two links 62 which are disposed symmetrically about each thruster 71. Each of the two links 62 is connected between a 30 inch hook and a 14 inch hook, respectively, designated at 70 and 72. These hooks are configured to engage differently sized stores, as described below.

Conventional stores ejection systems are designed to accommodate stores with diameters between 14 inches and 30 inches, at up to 22,500 pounds of ejection force. For stores weighing up to 1,450 pounds and diameters between 14 and 20 inches, the ejector rack must engage the store with two appropriately-sized bail lugs (not shown) spaced 14 inches apart along the length of the store. For stores weighing up to 5,000 pounds with diameters between 8 and 30 inches, the ejector rack must engage the store with two larger bail lugs spaced 30.0 inches apart along the length of the store. Conventional stores ejection systems, thus, include two store release hooks (large and small hooks) spaced apart by either 14 inches or 30 inches and sized to engage bail lugs for stores in either of two weight classes.

Two-hook ejection racks allow independent loading of each of the two store bail lugs into each of the hooks. The two hooks must be opened simultaneously, however, to properly release the store. The requirement that the hooks be loaded independently, but be opened simultaneously, dictates the use of a complex mechanical linkage between the hooks in a conventional two-hook stores ejection system.

In addition to the two sets of robust links 62 (only one set is shown in FIG. 2), more links are shown generally designated as 66. The other links 66 are connected to sear 64 for rotating the sear, upon a command, away from the upper surface of hook 72. Rotation of sear 64 enables hook 72 to pivot in a counter-clockwise (CCW) direction, thereby releasing a bail lug (not shown) which is attached to a small store (not shown), Simultaneously, links 62, which are connected between hook 72 and hook 70, pivot hook 70 and release a bail lug (not shown) attached to a larger store (not shown).

Completing the description of FIG. 2, there is shown a reversible in-flight lock (RIFL) actuator 74 and shaft 76. The RIFL is a safety device that mechanically and electrically "safes" the bomb rack preventing accidental release during flight and during ground maintenance operations. The hardware and structural integrity of the RIFL necessary to "block" an accidental filing is very robust (heavy) even when fabricated from the best (expensive) materials due to the large forces that must be resisted. The sear release linkage required to insure commanded releases are also very robust in order to be reliable under the same forces.

Figure 3:
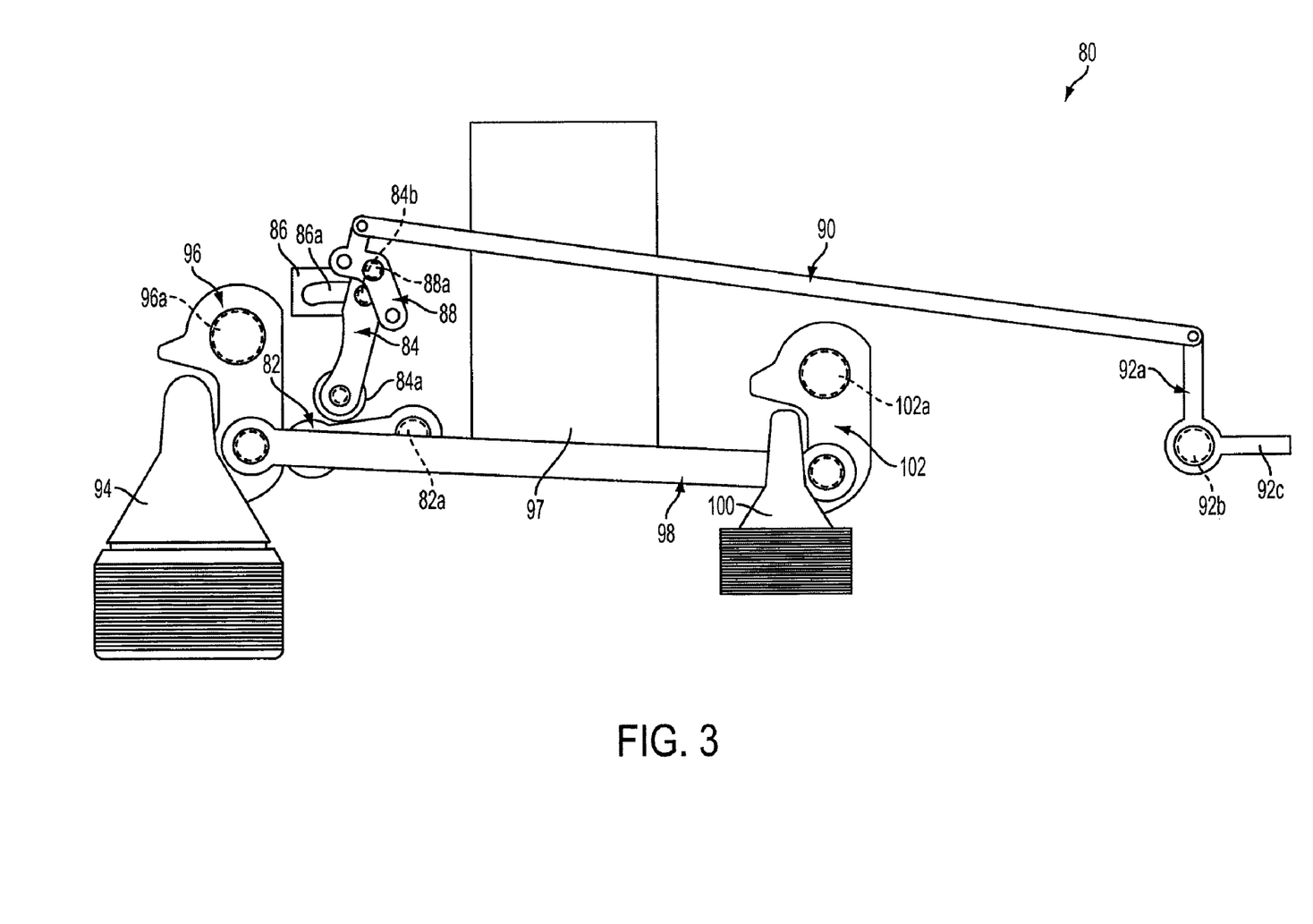
FIG. 3 is a low force release configuration for an ejection system, in accordance with one embodiment of the present invention, only showing details surrounding one thruster.

Referring now to FIG. 3, a low force release configuration for a pneumatic ejection system is shown designated as 80, in accordance with an embodiment of the present invention. The low force release configuration 80 mitigates the drawbacks described above with respect to conventional ejection systems. This low force release configuration frees up packaging space, allowing easier placement of additional sub-systems required in the bomb rack assembly.

Another differentiating aspect of the low force configuration of the present invention is that the sear on a 14 inch or 30 inch suspension rack may be applied at the 30 inch (larger) hook as opposed to the 14 inch (smaller) hook, thereby minimizing the size of the links between the 14 inch and 30 inch hooks that were previously sized to transfer load from the smaller hook to the larger hook. The links of the present invention need only retain the load from the larger hook to the smaller hook, and need only be sized for the smaller hook load, again saving weight and space. The sear may also be applied individually at each pair of hooks, as another possible embodiment.

The low force release configuration 80 includes large hook 96 (which may be similar to the 30 inch hook 70 in FIG. 2) engaged in a slot of lug 94 attached to a large store (now shown). Large hook 96 pivots about a large hook-pin 96a. In a similar manner, low force release configuration 80 includes small hook 102 (which may be similar to the 14 inch hook 72 in FIG. 2) engaged in a slot of lug 100 attached to a small store (not shown). Small hook 102 pivots about a small hook-pin 102a. When large hook 96 pivots about large hook-pin 96a in a counter-clockwise (CCW) direction, lug 94 is released from engagement with the large hook, thereby releasing the attached large store, In a similar manner, when small hook 102 pivots about small hook-pin 102a in a CCW direction, lug 100 is released from engagement with the small hook, thereby releasing the attached small store.

Hook-link 98 is configured to connect large hook 96 to small hook 102. In operation, large hook 96 and small hook 102 are simultaneously rotated to release an attached store. Although only one hook-link 98 is shown in FIG. 3, it will be understood that there are two hook-links 98 disposed facing each other, on opposite sides of thruster 97. It will also be understood that with two thrusters (similar to thrusters 30 and 32 shown in FIG. 1) there are two additional large and small hooks 96 and 102 connected by way of an additional set of hook-links 98 disposed facing each other, on opposite sides of the other thruster 97 (not shown).

Continuing the description of FIG. 3, primary sear 82 is configured to pivot in a clockwise (CW) direction, as primary sear 82 is rotatingly hinged at its first end to fixed pin 82a. The second end of primary sear 82 abuts large hook 96 and prevents any CCW rotation of large hook 96. In this nearly horizontal orientation shown in FIG. 3, primary sear 82 latches large hook 96 and positively prevents release of lug 94. Since hook-link 98 is connected between large hook 96 and small hook 102, the small hook is also prevented from releasing lug 100.

It will be appreciated now that the sear of the present invention is applied at the large hook (30 inch for example) as opposed to the small hook (14 inch for example), thereby minimizing the size of the links between the 14 inch and 30 inch hooks that were previously sized to transfer load from the smaller hook to the larger hook (as shown in FIG. 2). The links need only retain load for the larger hook to the smaller hook and need only be sized for the smaller hook load, saving weight and space.

It will be appreciated that primary sear 82 is sandwiched between the two opposing hook-links 98 (only one is shown in FIG. 3), similarly to the manner in which large hook 96 is sandwiched between the same two opposing hook-links 98

When primary sear 82 is permitted to rotate CW about fixed pin 82a, the pressure from the second end of primary sear 82 against large hook 96 is greatly reduced. This, in turn, permits large hook 96 to rotate in a CCW direction, which releases lug 94. In this manner, the sear of the present invention actuates the release of a store form the ejection rack on the aircraft.

A secondary sear, designated 84, applies a transverse pressure against primary sear 82. The secondary sear includes first and second ends along its longitudinal dimension. The first end is connected to sliding pin 84b, where the latter is configured to move across slit 86a of anchor 86. The slit 86a may be fixed in position, as anchor 86 may be bolted (for example) to the ejection system (not shown). The second end of secondary sear 84 includes circular disk 84a, which is configured to move along the longitudinal surface of primary sear 82.

When circular disk 84a is positioned adjacent the second end of primary sear 82, sufficient pressure is applied by secondary sear 84 against primary sear 82 to prevent actuation (or release) of lug 94 by CCW movement of large hook 96. On the other hand, when circular disk 84a is moved toward the first end, or the hinged end, of primary sear 82, the primary sear is permitted to rotate CW and actuate the release of lug 94.

The movement of the second end of secondary sear 84 along the longitudinal surface of primary sear 84 and the movement of the first end of secondary sear 84 across slit 86a are simultaneously effectuated by the linkage of actuating-lever 92c, rotating-lever 92a, sear-link 90 and pivot-link 88. As shown in FIG. 3, actuating-lever 92c and rotating-lever 92a are fixed with respect to each other, and both may be pivoted with respect to fixed pin 92b. Sear-link 90 is configured to connect rotating-lever 92a with pivot-link 88. The pivot-link 88 may be pivoted with respect to fixed pin 88a.

In operation, pivoting actuating-lever 92c about fixed pin 92b causes rotating-lever 92a to also pivot, thereby moving sear-link 90 in a linear direction. As sear-link 90 moves, pivot-link 88 is caused to pivot about fixed pin 88a. The pivoting of pivot-link 88 forces sliding pin 84b to move across slit 86a. The movement of sliding pin 84b, in turn, changes the angle between the longitudinal dimension of secondary sear 84 and the longitudinal dimension of primary sear 82. As the second end of secondary sear 84 moves away from the second end of primary sear 82, the primary sear reduces its pressure against large hook 96. The large hook may then be pivoted by hook-link 98 to, thereby, release the lug of the store.

It will be appreciated that the complication and, therefore cost, of a conventional bomb ejection system is in packaging all the porting needed around the large area and stroke pistons required to reliably remove the sear from the hook, under high g-force loads generated by modern fighter aircraft. By significantly reducing the force required, the present invention reduces the piston swept area, simplifying the valve body size and cost. The low force release configuration of the present invention also opens the door to isolating the release and ejection functions. The release may be accomplished by an electric solenoid and the ejection by mechanical linkage. This may eliminate the PPM entirely, basically redefining current pneumatic bomb rack design. The RIFL within the PPM, which includes an electric solenoid acting as a pilot valve for the RIFL actuator, may now include only the electric solenoid, further simplifying and reducing PPM cost.

Figure 4A:
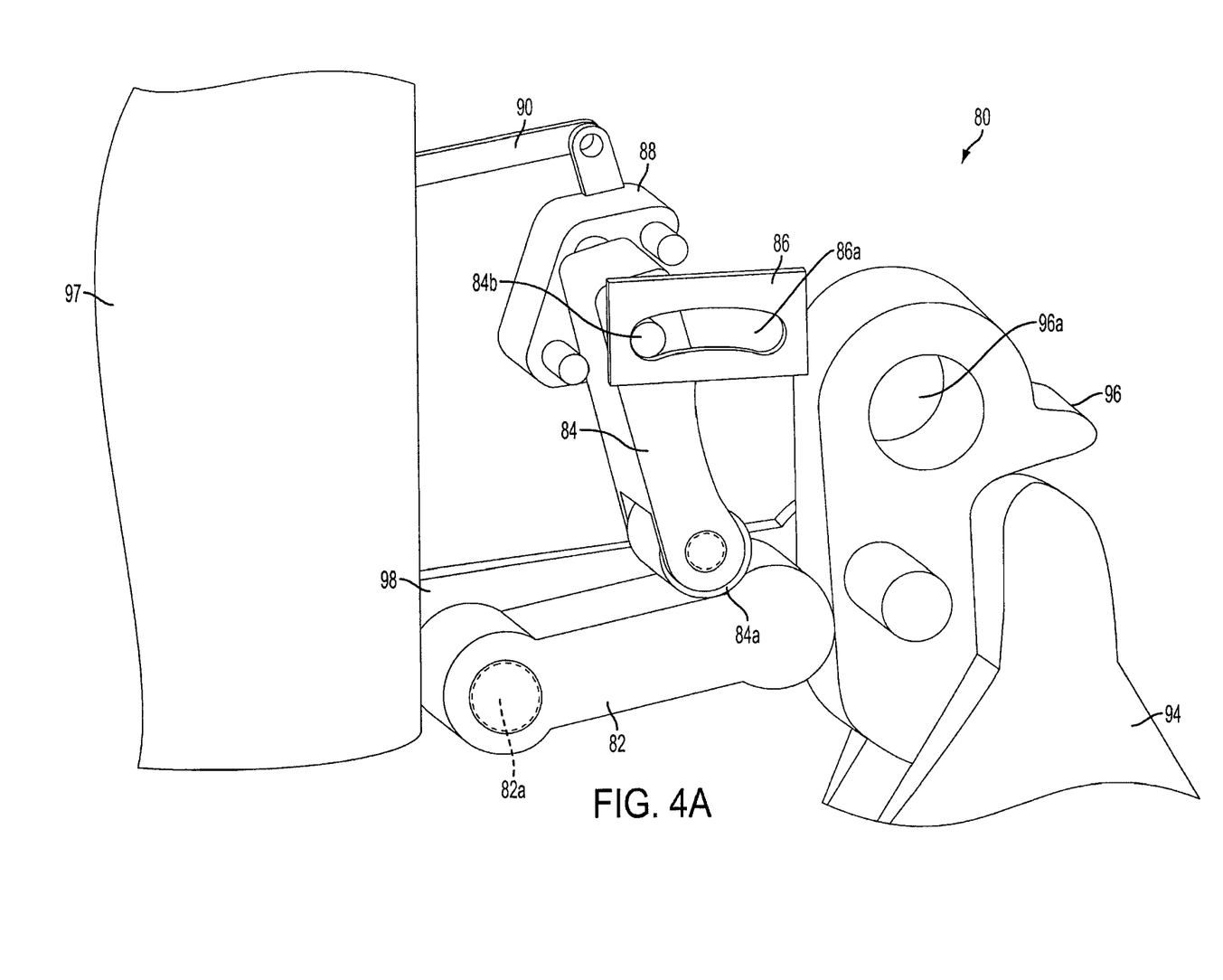
FIG. 4a is an isometric view of a small portion of the low force release configuration shown in FIG. 3, at one instant in time, during operation, in accordance with an embodiment of the present invention.
Figure 4B:
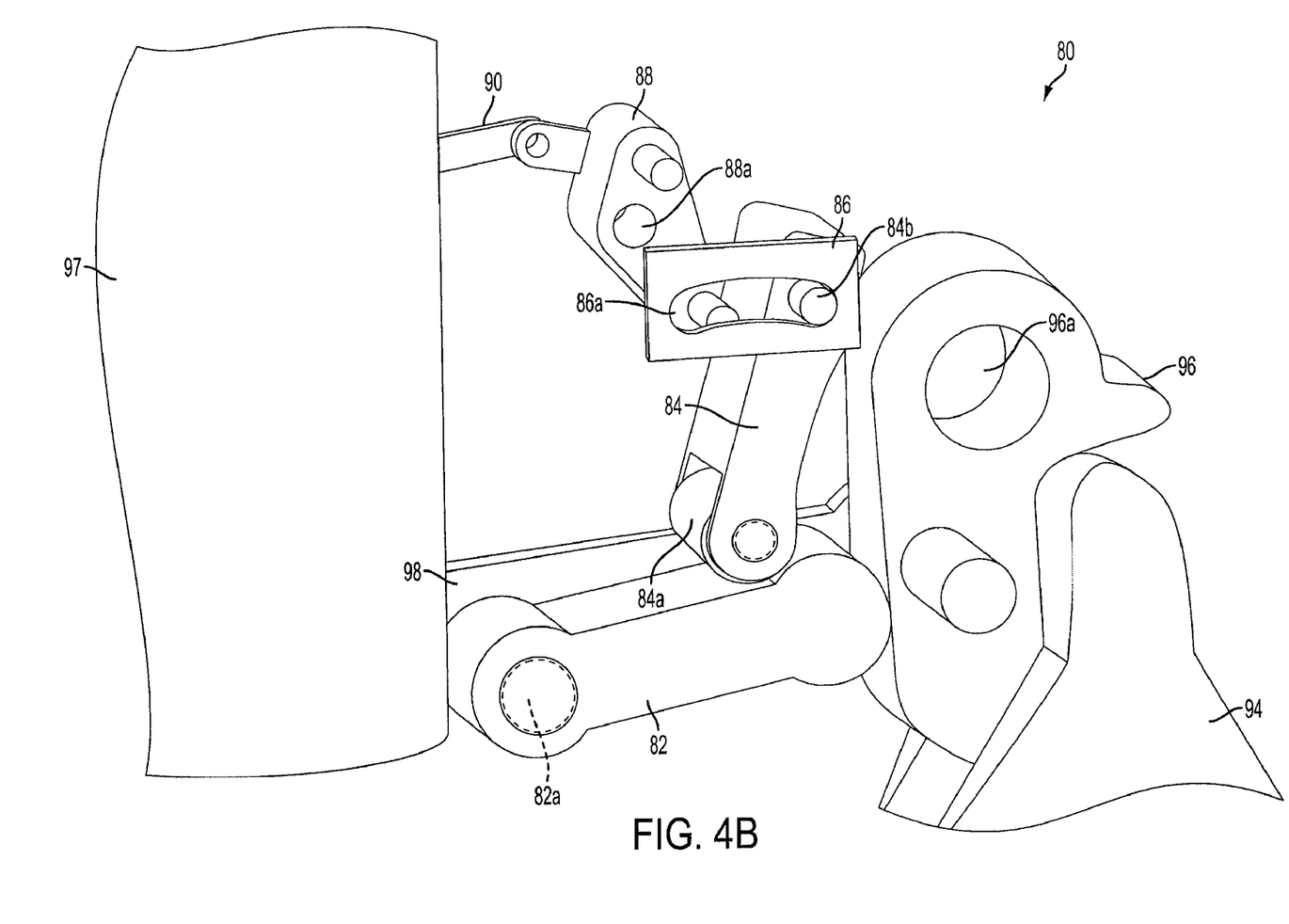
FIG. 4b is an isometric view of the same small portion of the low force release configuration shown in FIG. 4a, at another instant in time, during operation, in accordance with an embodiment of the present invention.
Figure 4C:
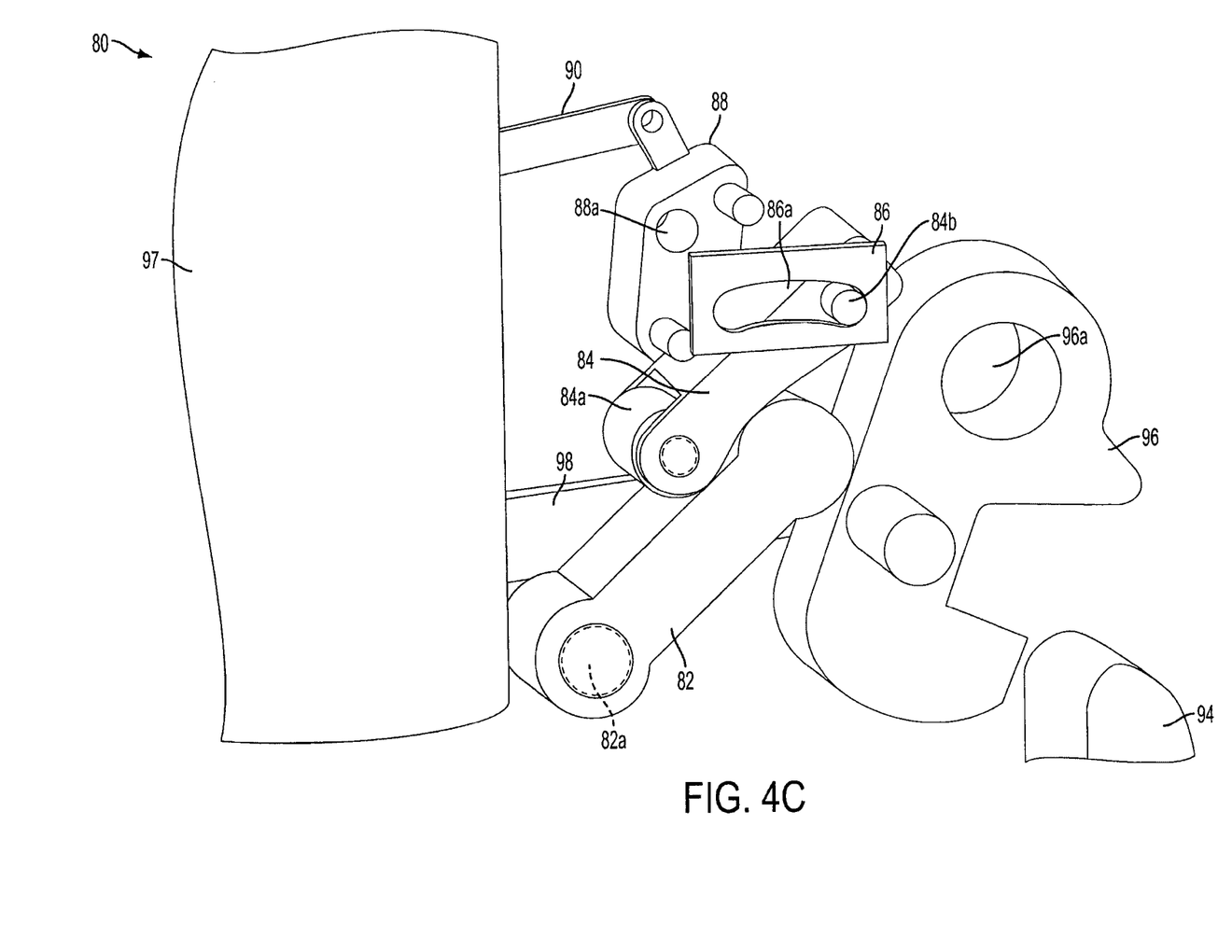
FIG. 4c is an isometric view of the same small portion of the low force release configuration shown in FIG. 4a, at yet another instant in time, during operation, in accordance with an embodiment of the present invention.

Referring next to FIGS. 4a, 4b and 4c, there are shown isometric views of a portion of low force release configuration 80, at three different time periods during operation. It will be appreciated that the views shown in FIGS. 4a, 4b and 4c are taken from an opposite view to that view shown in FIG. 3. Thus, for example, sear-link 90 and hook-link 98 are viewed behind thruster 97. It will also be appreciated that the other hook-link 98 has been omitted. The other hook-link 98 would be positioned opposite to hook-link 98, the latter seen behind thruster 97.

The fixed pins for large hook 96, primary sear 82, and pivot-link 88 are shown as circular slots 96a, 82a and 88a, respectively. The anchoring means of anchor 86 by bolts (for example) is omitted for the sake of clarity. The sliding-pin 84b of secondary sear 84 is only shown as a circular spot, designated as 84b. The pin connecting sear-link 90 to pivot-link 88 is omitted.

Referring next to the actuation and release sequences provided by low force release configuration 80, FIG. 4a provides a view in which primary sear 82, by pressure applied from secondary sear 84, is preventing actuation of a store release, by preventing large hook 96 from releasing lug 94.

FIG. 4b provides a successive view of the actuation and release sequences. As shown, secondary sear 84 has pivoted in a CW direction (in FIG. 3 it is a CCW direction), so that sliding-pin 84b is positioned at a right-end of slit 86a (in FIG. 4a, sliding-pin 84b is positioned at a left-end of slit 86a). The circular disk 84a is now ready to move to the left along the longitudinal dimension of primary sear 82. This relieves the pressure from the primary sear against the large hook 96. The sear has now actuated the ejection system for release of the store.

Lastly, FIG. 4c is yet another successive view of the actuation and release sequences. As shown, with the pressure of the primary sear significantly reduced against large hook 96, hook-link 98, with a small force, is effective in pivoting large hook 96 in a CW direction. The circular disk 84*a* easily moves along the longitudinal dimension of primary sear 84, as primary sear 84 is forced to be pivoted in a CCW direction, upon a release command from the cockpit of the aircraft (for example). The lug 94 is released from large hook 96, thereby releasing the store.

The ejection sequence, which uses thrusters 97 to push away the store from the ejection system may be similar to that previously described.

Figure 5:
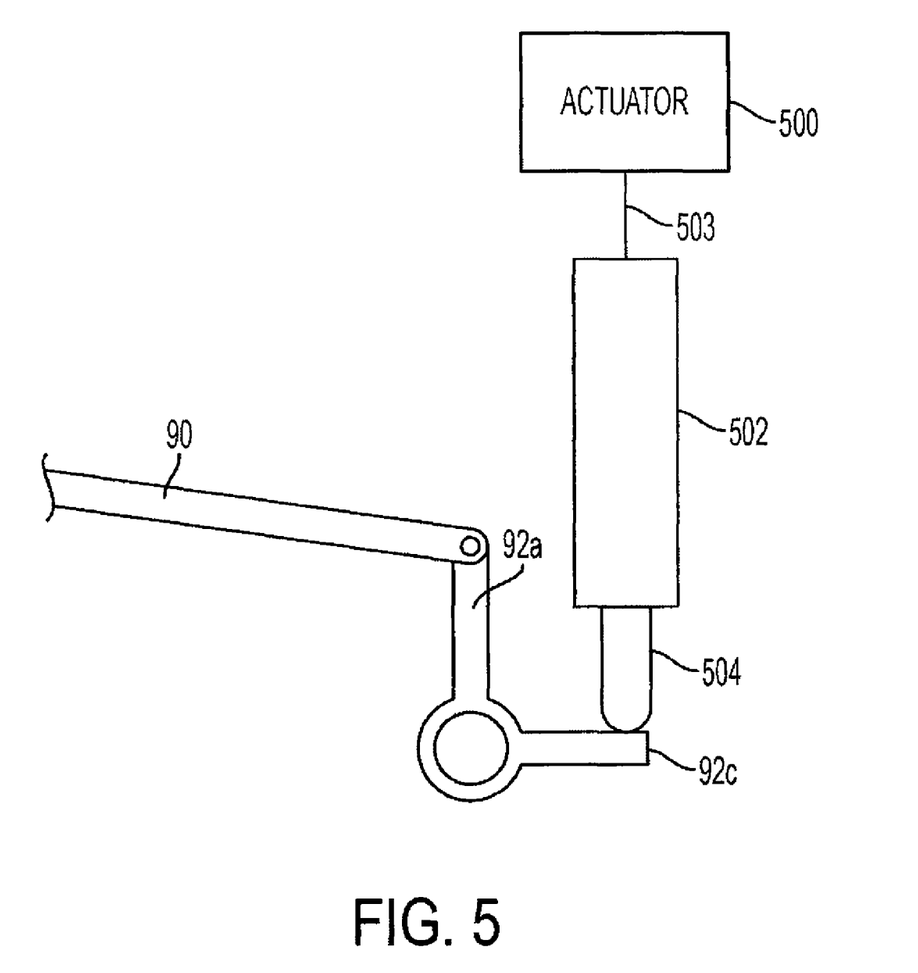
FIG. 5 is an isometric view of a small portion of the low force release configuration seen in FIG. 3, showing an exemplary actuation system for engaging a lever which actuates the low force release configuration.

Referring next to FIG. 5, there is shown an exemplary actuation system including actuator 500, thruster 502 and piston 504. As shown, the actuation system is a pneumatic system actuated by compressed air from a remotely located on board pressurization unit (not shown). Actuator 500 is in fluid communication with thruster 502 by way of feed conduit 503. Upon command, high pressure air is provided to thruster 502 for moving piston 504 in a downwardly direction. In turn, piston 504 engages actuating-lever 92*c* and rotates lever 92*a* in a clockwise direction. In turn, sear-link 90 moves to reduce pressure against large hook 96, as described previously with respect to FIG. 3. The large hook 96 may then be pivoted by hook-link 98 to release the lug of the store.

It will be appreciated that actuator 500 may be a hydraulic system. Furthermore, the actuator system components (500, 503, 502 and 504) may be replaced by an electric solenoid having a moving rod (similar to piston 504) for engaging or disengaging actuating-lever 92*c*. Further still, the actuator system may be a gear-motor which turns a ball screw for engaging or disengaging actuating-lever 92*c*. The actuator system may even be a mechanical shaft controlled manually by personnel.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A low force weapon ejection system comprising:
a large hook for engaging a lug of a heavy store,
a small hook for engaging a lug of a small store,
a hook-link connected directly between the large hook and small hook, and
configured to directly pivot the large and small hooks and release the heavy store and the small store,
a primary sear configured to apply a primary pressure only against the large hook, and
a secondary sear configured to apply a secondary pressure only against the primary sear,
wherein (a) when the primary and secondary pressures are applied, the large and small hooks are prevented from releasing the stores, and
(b) when the primary and secondary pressures are reduced, the large and small hooks are enabled to release the stores; and
a sear-link coupled to the secondary sear, in which, in sequence, the sear-link is configured to pivot the secondary sear, the secondary sear is configured to pivot the primary sear, the primary sear is configured to pivot the large hook, the large hook is configured to move the hook-link, and the hook-link is configured to pivot the small hook,
wherein load is transferred from the large hook to the small hook for reducing size of the hook-link, the secondary sear includes a circular disk for moving on a surface of the primary sear, and
facilitating reduction of pressure by the primary sear onto the hook.

2. The ejection system of claim 1 wherein
the primary sear includes first and second primary ends,
the first primary end is hinged for pivoting,
the second primary end is configured to apply pressure against the hook, and
when the second primary end is pivoted transversely against the hook, the applied pressure prevents the hook from releasing the store.

3. The ejection system of claim 1 wherein
the primary sear includes first and second primary ends forming a longitudinal primary line therebetween,
the secondary sear includes first and second secondary ends forming a longitudinal secondary line therebetween,
the primary line is oriented to move transversely to the secondary line, and
when the second secondary end is disposed adjacent to the second primary end, the hook is prevented from releasing the store.

4. The ejection system of claim 3 wherein
the first primary end is hinged for pivoting,
the second primary end is configured to apply pressure against the hook,
the first secondary end is coupled to an actuator, and
when the actuator is set to actuate a release of the store, the second secondary end is pivoted away from the second primary end to reduce pressure against the primary sear.

5. The ejection system of claim 3 wherein
an actuator is configured to pivot the secondary sear, upon an actuation command, and
the primary line moves transversely to the secondary line, upon the actuation command.

6. The ejection system of claim 1 wherein
the hook-link is coupled to a valve controlled by an accumulator, and
the accumulator provides power to the valve to pivot the hook and release the store.

7. The ejection system of claim 1 further including
a thruster for forcibly pushing away the store from the small hook,
wherein the thruster is operated independently from the small hook releasing the store.

8. A low force weapon ejection system comprising:
a large hook and a small hook for, respectively, engaging a large store and a small store,
a primary sear having first and second primary ends, the first primary end hinged for pivoting, and the second primary end configured to move longitudinally along a surface of the large hook, and
a secondary sear having first and second secondary ends, the first secondary end coupled to an actuator, and the second secondary end configured to move along a surface of the primary sear,
a hook-link connected directly between the large and small hooks,
wherein (a) when the actuator is set to prevent release of the stores, the second secondary end is configured to apply pressure against the primary sear and, in turn, the second primary end is configured to apply pressure against the large hook and prevent release of the large store, and in turn, the hook-link is configured to prevent pivoting of the small hook and prevent release of the small store, and (b) when the actuator is set to enable the release of the stores, the second secondary end is configured to reduce pressure against the primary sear and, in turn, the second primary end is configured to reduce pressure against the large hook and enable the release of the large store, and in turn, the hook-link is configured to pivot the small hook and enable release of the small store.

9. The ejection system of claim 8 wherein
the first and second primary ends form a longitudinal primary line therebetween,
the first and second secondary ends form a longitudinal secondary line therebetween, and
the primary line is oriented to move transversely to the secondary line, and during a portion of an operating time, the primary line becomes perpendicular to the secondary line.

10. The ejection system of claim 9 wherein
an actuator is configured to pivot the secondary sear, upon an actuation command, and
the primary line moves transversely to the secondary line, upon the actuation command.

* * * * *